United States Patent
Li et al.

(10) Patent No.: US 9,158,122 B2
(45) Date of Patent: Oct. 13, 2015

(54) LIGHT SOURCE MODULE FOR STEREOSCOPIC DISPLAY, IMAGING DEVICE FOR STEREOSCOPIC DISPLAY AND STEREOSCOPIC DISPLAY SYSTEM

(75) Inventors: Wei Li, Qingdao (CN); Yu Chen, Qingdao (CN); Guofeng Yan, Qingdao (CN); Dabo Guo, Qingdao (CN); Chenzhi Wan, Qingdao (CN); Haixiang Zhang, Qingdao (CN)

(73) Assignee: HISENSE HIVIEW TECH CO., LTD., Qingdao, Shandong (CN)

( * ) Notice: Subject to any disclaimer, the term of this patent is extended or adjusted under 35 U.S.C. 154(b) by 73 days.

(21) Appl. No.: 13/817,471

(22) PCT Filed: Sep. 8, 2010

(86) PCT No.: PCT/CN2010/076735
§ 371 (c)(1),
(2), (4) Date: Feb. 18, 2013

(87) PCT Pub. No.: WO2012/031392
PCT Pub. Date: Mar. 15, 2012

(65) Prior Publication Data
US 2013/0141553 A1    Jun. 6, 2013

(51) Int. Cl.
*G02B 27/26* (2006.01)
*H04N 13/04* (2006.01)
*G02B 27/10* (2006.01)

(52) U.S. Cl.
CPC ............ *G02B 27/26* (2013.01); *H04N 13/0427* (2013.01); *H04N 13/0438* (2013.01); *H04N 13/0459* (2013.01)

(58) Field of Classification Search
CPC .............. G02B 27/26; H04N 13/0427; H04N 13/0459; H04N 13/0438
See application file for complete search history.

(56) References Cited

U.S. PATENT DOCUMENTS 4,805,977 A * 2/1989 Tamura et al. .................. 385/47
4,881,790 A * 11/1989 Mollenauer .................. 398/180
(Continued)

FOREIGN PATENT DOCUMENTS

CN    1987552 A    6/2007
JP    2010-128414 A    6/2010

OTHER PUBLICATIONS

International Search Report (PCT/ISA/210) issued on Jun. 16, 2011, by the Chinese Patent Office as the International Searching Authority for International Application No. PCT/CN2010/076735.
(Continued)

*Primary Examiner* — Behrooz Senfi
*Assistant Examiner* — Mohammed Jebari
(74) *Attorney, Agent, or Firm* — Buchanan Ingersoll & Rooney PC

(57) ABSTRACT

A light source module for stereoscopic display includes multi-primary color lasers which output the light with the same polarization direction. Respective lasers are divided into two groups according to the wavelengths of the output light. A light combiner is provided in the output light path of each laser group and is used for combining the output light of all lasers in the group into one output light path. The light source module further includes a polarization conversion rotary member, and the polarization direction of the two output light is periodically and alternately rotated by 90 degree by self-rotation of the polarization conversion rotary member. An imaging device for stereoscopic display includes the light source module for stereoscopic display, the light combiner and a first optical imaging modulator and a second optical imaging modulator. A stereoscopic display system includes the imaging device for stereoscopic display and a projection lens sub-system.

7 Claims, 4 Drawing Sheets

(56) References Cited

U.S. PATENT DOCUMENTS

| | | | |
|---|---|---|---|
| 5,879,065 A * | 3/1999 | Shirochi et al. | 353/8 |
| 2002/0141698 A1 * | 10/2002 | Matsushita et al. | 385/31 |
| 2003/0095733 A1 * | 5/2003 | Lin | 385/11 |
| 2004/0165153 A1 * | 8/2004 | Maximus | 353/30 |
| 2006/0044516 A1 * | 3/2006 | Inoko | 353/20 |
| 2007/0139617 A1 | 6/2007 | DeCusatis et al. | |
| 2009/0213330 A1 * | 8/2009 | Silverstein et al. | 353/8 |
| 2009/0284713 A1 | 11/2009 | Silverstein et al. | |
| 2010/0103519 A1 | 4/2010 | Silverstein et al. | |

OTHER PUBLICATIONS

Written Opinion (PCT/ISA/237) issued on Jun. 16, 2011, by the Chinese Patent Office as the International Searching Authority for International Application No. PCT/CN2010/076735, and an English translation thereof.

* cited by examiner

LIGHT SOURCE MODULE FOR STEREOSCOPIC DISPLAY, IMAGING DEVICE FOR STEREOSCOPIC DISPLAY AND STEREOSCOPIC DISPLAY SYSTEM

This application is a National Stage application of international application PCT/CN2010/076735 filed on Sep. 8, 2010, which is incorporated herein by reference in its entirety.

FIELD OF THE INVENTION

The present invention relates to the field of stereoscopy, and in particular to a stereoscopic light source module, a stereoscopic imaging device and a stereoscopic display system.

BACKGROUND OF THE INVENTION

With the continuous improvement in the quality of life, higher requirements for display technologies have been put forward. 3D, stereoscopic technology is one of the most important trends in current development of display technologies.

Currently, there are the following categories of stereoscopic technology.

Dual-color glasses based method:

In this method, a scene to be displayed on the screen is filtered with a driver program. Specifically, the image intended for the left eye is filtered to remove red, and the image intended for the right eye is filtered to remove cyan (blue and green). The viewer wears a pair of dual-color glasses. A filter lens over the left eye blocks red, and a filter lens over the right eye blocks cyan. Therefore, the left eye sees only the image intended for the left eye, and the right eye sees only the image intended for the right eye. The brain fuses both images into perception of regular colors. This is the lowest cost method of stereoscopic technology, but it is generally only suitable for scenes where color is not an important factor. As to other types of scenes, it may cause discomfort of viewers and severe color distortion due to the loss of color information.

Active stereoscopic method:

In this method, a driver program alternately transmits left eye and right eye images, for example, a left eye image at a first frame, a right eye image at a second frame, another left eye image at a third frame, and so forth. The viewer wears a pair of shutter glasses in synchronization with the display device in a wired or wireless manner. While presenting the left eye image, the display device opens the shutter in the left glass and closes the shutter in the right glass. While presenting the right eye image, the display device opens the shutter in the right glass and closes the shutter in the left glass. According to the phenomenon of persistence of vision, an afterimage is thought to persist in front of the eye whose view is blocked, and any viewer within the range can see a three-dimensional scene wearing a pair of the stereoscopic glasses. Generally, the shutters in the glasses are implemented with liquid crystals. The liquid crystal layer can be switched between transparent and dark by an applied electrical signal. This method reduces the brightness of the image in half, and has certain frequency requirements on the refresh rates of the display device and the shutters in the glasses, demanding more on the properties of the display device and the glasses, and resulting in higher manufacturing cost. Moreover, flicker caused by the frequent switching of the stereoscopic glasses is displeasing to the eye, and may tire the viewer.

Passive synchronization stereoscopic method:

In this method, a driver program simultaneously outputs left eye and right eye images. The left eye and right eye images are projected using two projectors. A polarizing filter is provided in front of the projector for the left eye image, and an orthogonal polarizing filter is provided in front of the projector for the right eye image. The viewer wears a pair of glasses, which also contain a pair of polarizing filters oriented the same as the projectors. According to the polarizing effect, each eye only sees the image intended for the eye itself. Currently, this is the stereoscopic method producing the best imaging results. However, since light emitted from the projector light source is like natural light, the polarizing filters on the outputs of the projectors cost 50% of the light energy, reducing the utilization rate of the light energy. Moreover, the use of two projection subsystems is costly, requires a large space and may cause inconvenience in installation and moving.

Due to its advantages such as wide color gamut and low energy consumption, laser-based display technology is considered one of the prominent, next generation display technologies. Combining laser-based display with stereoscopic projection is the current trend, one implementation of which is an active stereoscopic method. The screen alternately presents left eye and right eye images at twice the frequency, and the glasses dynamically block one of the eyes. That is, present the left eye image while blocking the right eye's view, and present the right eye image while blocking the left eye's view, so that the eyes are provided with different images, which are fused by the brain into perception of a three-dimensional scene. Multi-color display makes use of time-domain control, e.g., lights of different wavelengths are transmitted during different time slots according to a color wheel. Since each wavelength is illuminated separately during one time slot, the utilization rate of the laser light source is low. Moreover, the existing stereoscopic projection method includes two projection subsystems, one for projecting the left eye image and the other for projecting the right eye image, therefore, the size of the projection system is large, installation and moving inconvenience may be caused, and manufacturing and production costs are high. Furthermore, each of the left eye and right eye images uses only half of the light energy output from the laser, resulting in a low brightness of the image.

SUMMARY OF THE INVENTION

In view of the above, an object of an embodiment of the present invention is to provide a stereoscopic light source module, a stereoscopic imaging device and a stereoscopic display system, which can improve the utilization rate of the light source.

In order to achieve the above object, an embodiment of the present invention provides a stereoscopic light source module, including a plurality of primary-color lasers, wherein lights output by the lasers have the same polarization direction; the plurality of primary-color lasers are divided into two groups according to the wavelengths of their output lights, so that lasers whose output lights are of the same wavelength belong to the same group, and lasers in each of the groups output lights of at least one wavelength; an output light path of each of the groups is provided with a light combining element, and the combining element is adapted to combine the lights output from all the lasers in one group into one beam;

the stereoscopic light source module further includes a polarization conversion rotary element arranged in the paths of the two beams output from the light combining elements, and the polarization conversion rotary element is adapted to periodically, alternately change polarization directions of the two beams output from the light combining elements by 90 degrees.

Preferably, the polarization conversion rotary element may have a roulette-based structure; the surface of the polarization conversion rotary element is perpendicular to a transmission direction of the two beams obtained from the light combining elements for the two groups; a rotation axis of the polarization conversion rotary element is parallel to the transmission direction of the two beams obtained from the light combining elements for the two groups;

the polarization conversion rotary element is divided into polarization conversion regions and polarization non-changing regions that are positioned alternately in the direction of rotation; each of the polarization conversion regions is a half-wave plate for changing the polarization direction of light passing through it by 90 degrees; each of the polarization non-changing regions is a transparent region that does not make any change to the polarization direction of light passing through it; during rotation of the polarization conversion rotary element, one beam from one group strikes a polarization conversion region, while one beam from the other group strikes a polarization non-changing region.

Preferably, the polarization conversion rotary element may have a sheet-shaped structure; the surface of the sheet-shaped structure is perpendicular to a plane formed by transmission paths of the two beams obtained from the light combining elements for the two groups; and the rotation axis of the polarization conversion rotary element is perpendicular to a plane formed by the transmission paths of the two beams obtained from the light combining elements for the two groups;

the polarization conversion rotary element is divided into a first region and a second region along the direction from one of the two incident beams to the other; the first region is a half-wave plate for changing the polarization direction of light passing through it by 90 degrees; the second region is a transparent region that does not make any change to the polarization direction of light passing through it; the rotation axis of the polarization conversion rotary element is positioned at an interface between the first region and the second region; during rotation of the polarization conversion rotary element, one beam from one group strikes the first region, while one beam from the other group strikes the second region.

Preferably, the polarization conversion rotary element may have a sheet-shaped structure, the surface of the sheet-shaped structure is perpendicular to a plane formed by transmission paths of the two beams obtained from the light combining elements for the two groups; the rotation axis of the polarization conversion rotary element is perpendicular to a plane formed by the transmission paths of the two beams obtained from the light combining elements for the two groups, and is positioned at one end of the polarization conversion rotary element;

the polarization conversion rotary element is formed by a half-wave plate which is adapted to change the polarization direction of light passing through it by 90 degrees; during rotation of the polarization conversion rotary element, the polarization conversion rotary element alternately cuts through the two beams from the two groups.

Preferably, lasers in each of the groups may output lights in an alternating manner.

Preferably, the plurality of primary-color lasers may include three lasers for outputting red, green and blue lights, wherein the red and blue lasers belong to one group and the green laser belongs to the other group.

In another aspect, an embodiment of the present invention provides a stereoscopic imaging device, including the stereoscopic light source module as described above, a beam combining element, a polarizing splitting and combining element and a first optical imaging modulator and a second optical imaging modulator, wherein the beam combining element is adapted to combine two beams output by the stereoscopic light source module into one beam; the polarizing splitting and combining element is adapted to receive the one beam output by the beam combining element, divide it into a p-polarized component and an s-polarized component, and input the p-polarized component and the s-polarized component to the first optical imaging modulator and the second optical imaging modulator respectively; the first optical imaging modulator is adapted to modulate the p-polarized incident light according to an image signal; the second optical imaging modulator is adapted to modulate the s-polarized incident light according to an image signal; the polarizing splitting and combining element is also adapted to combine the modulated, p-polarized and s-polarized lights from the first optical imaging modulator and the second optical imaging modulator into one beam.

Preferably, the beam combining element may include a focusing lens and a light uniforming device; the focusing lens is adapted to focus the two beams output by the stereoscopic light source module to the light uniforming device; the light uniforming device is adapted to uniform the two beams focused by the stereoscopic light source module, and output one uniform beam.

Preferably, the first optical imaging modulator and the second optical imaging modulator may be liquid crystal devices or Digital Micromirror Device (DMD) chips.

In another aspect, an embodiment of the present invention provides a stereoscopic display system, including the stereoscopic imaging device as described above and a projection lens subsystem for projecting the output light from the stereoscopic imaging device.

In the stereoscopic light source module, the stereoscopic imaging device and the stereoscopic display system according to the embodiments of the present invention, the lasers are divided into two groups according to the wavelengths of their output lights, and the lasers in each of the groups output lights in an alternating manner. Hence, time-domain control is achieved inside the group, but light output from one group as a whole is continuous. Therefore, compared with the prior art where all the lasers are illuminated sequentially, the stereoscopic light source module, the stereoscopic imaging device and the stereoscopic display system according to the embodiments of the present invention can improve the utilization rate of the light source. Especially in the case where a group has only a laser outputting light of one wavelength, the group always outputs light, resulting in an even higher utilization rate of the light source.

Moreover, the stereoscopic light source module, the stereoscopic imaging device and the stereoscopic display system according to the embodiments of the present invention use one projection subsystem instead of two projection subsystems one for each eye, which improves the utilization rate of the light source, lowers manufacturing and processing costs, and reduces the size of the device and the system. In addition, reducing the number of optical devices can further lower maintenance expense of the device and the system, e.g., by reducing the time required for light path calibration.

Furthermore, in the stereoscopic light source module according to the embodiment of the present invention, light of any wavelength from the light combining element is output alternately between p-polarized and s-polarized over time; and whether it is p-polarized or s-polarized, the power of it is almost equal to the total output power of the laser whose output light is of the wavelength. Compared with the prior art where the polarized light output by a laser is divided simultaneously into a p-polarized component and an s-polarized component, the stereoscopic light source module according to the embodiment of the present invention has a higher power of the s-polarized output and a higher power of the p-polarized output. Furthermore, the stereoscopic imaging device according to the embodiment of the present invention forms s-polarized and p-polarized images using the s-polarized light and the p-polarized light output from the stereoscopic light source module as described above. Therefore, with the same laser driving power, the brightness of the eventual s-polarized and p-polarized images formed by the stereoscopic imaging device according to the embodiment of the present invention is higher than the prior art. The stereoscopic display system according to the embodiment of the present invention uses the stereoscopic imaging device as described above, also increasing the brightness of the eventual s-polarized and p-polarized images.

BRIEF DESCRIPTION OF THE DRAWINGS

For a better illustration of the technical solutions in the embodiments of the present invention or in the prior art, accompanying drawings used in the description of the embodiments or the prior art are described briefly below. Clearly, the accompanying drawings described below are merely some of the embodiments of the present invention; and other drawings can be obtained by those skilled in the art based on these drawings without inventive effort.

DETAILED DESCRIPTION OF THE EMBODIMENTS

For a better understanding of the objects, technical solutions and advantages of the embodiments of the present invention, the technical solutions in the embodiments of the present invention will be described in conjunction with the accompanying drawings. Clearly, the embodiments described herein are merely some of the embodiments of the present invention. Any other embodiment obtained by those skilled in the art without inventive effort based on the embodiments described herein shall fall within the scope of protection of the present invention.

Figure 1:
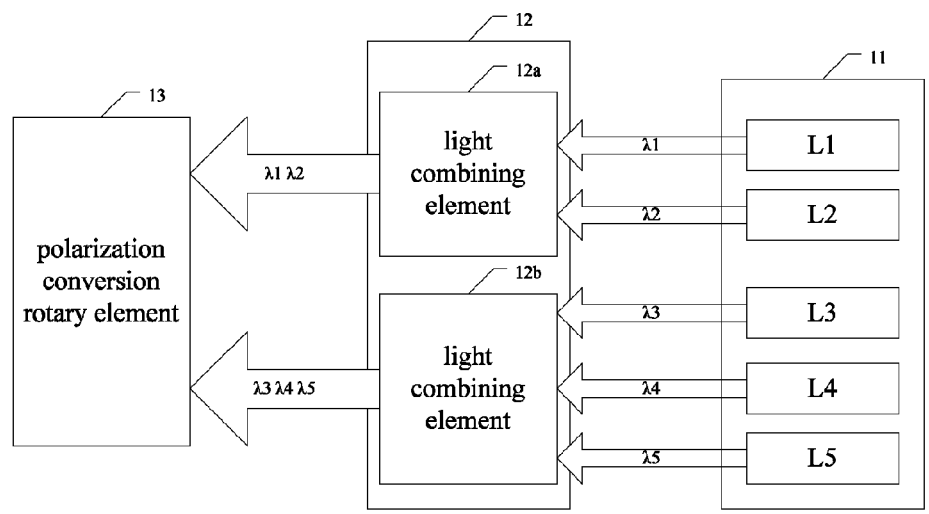
FIG. 1 is a schematic diagram illustrating a stereoscopic light source module provided by an embodiment of the present invention.

FIG. 1 is a schematic diagram illustrating a stereoscopic light source module provided by an embodiment of the present invention. As shown in FIG. 1, the stereoscopic light source module includes a plurality of primary-color lasers 11. The plurality of primary-color lasers include, e.g., 5 lasers denoted from L1 to L5 as shown in FIG. 1. Lights output by the lasers in the plurality of primary-color lasers 11 have the same polarization direction, e.g., all p-polarized or all s-polarized. The lasers in the plurality of primary-color lasers 11 are divided into two groups according to the wavelengths of their output lights, so that lasers whose output lights are of the same wavelength belong to the same group, and lasers in each of the groups output lights of at least one wavelength. Assuming that the wavelengths of the output lights of the lasers L1-L5 in FIG. 1 are $\lambda_1$-$\lambda_5$ respectively, the lasers L1 and L2 whose output lights are of the wavelengths $\lambda_1$ and $\lambda_2$ can be divided into a group G1; the lasers L3-L5 whose output lights are of the wavelengths $\lambda_3$-$\lambda_5$ can be divided into a group G2. The stereoscopic light source module further includes light combining elements 12. A light combining element 12 is used to combine the lights output from all the lasers in one group into one beam. Hence, by the light combining elements 12, the lights output from the two groups are combined into two beams. In practice, if the number of lasers in each of the two groups is greater than or equal to 2, both groups needs to be provided with a corresponding light combining element. For example, as shown in FIG. 1, a light combining element 12a is arranged in the output light path of the first group G1, and a light combining element 12b is arranged in the output light path of the second group G2. The polarized lights output by the lasers L1 and L2 in the same polarization direction are combined into one beam by the light combining element 12a, and the polarized lights output by the lasers L3-L5 in the same polarization direction are combined into one beam by the light combining element 12b. Clearly, in the case where a group has only one laser, the output light path of the laser may not be provided with a light combining element.

Since the lights output by all the lasers have the same polarization direction, the two beams obtained through the light combining elements are also lights in the same polarization direction that do not have changed polarization directions.

A polarization conversion rotary element 13 is arranged in the paths of the two beams output from the light combining elements 12. The polarization conversion rotary element 13 may actively rotate driven by a driving structure, so as to periodically, alternately change the polarization directions of the two beams from the light combining elements 12 by 90 degrees. For example, in the case as shown in FIG. 1, assuming that the polarized lights output by the all the lasers are p-polarized, the two beams obtained from the light combining elements 12a and 12b are also p-polarized. The two p-polarized beams are of different wavelengths. The polarization conversion rotary element 13 alternately converts the two p-polarized beams into s-polarized. That is, the polarization conversion rotary element 13 has two operating states. In a first operating state, the polarization conversion rotary element 13 converts the p-polarized beam obtained from the light combining element 12a into s-polarized, without changing the polarization direction of the p-polarized beam obtained from the light combining element 12b. As a result, in the first operating state, by the polarization conversion rotary element 13, the stereoscopic light source module outputs one p-polarized beam and one s-polarized beam, with the p-polarized beam including lights of the wavelengths $\lambda_1$ and $\lambda_2$ and the s-polarized beam including lights of the wavelengths $\lambda_3$-$\lambda_5$. In a second operating state, the polarization conversion rotary element 13 converts the p-polarized beam obtained from the light combining element 12b into s-polarized, without changing the polarization direction of the p-polarized beam obtained from the light combining element 12a. As a result, the stereoscopic light source module outputs one s-polarized beam and one p-polarized beam, with the p-polarized beam including lights of the wavelengths $\lambda_3$-$\lambda_5$ and the s-polarized beam including lights of the wavelengths $\lambda_1$ and $\lambda_2$.

The lasers in each of the groups output lights in an alternating manner, achieving time-domain control.

As can be seen, in the stereoscopic light source module according to the embodiment of the present invention, the lasers are divided into two groups according to the wavelengths of their output lights, and the lasers in each of the groups output lights in an alternating manner. Hence, time-domain control is achieved inside the group, but light output from one group as a whole is continuous. Therefore, compared with the prior art where all the lasers are illuminated sequentially, the stereoscopic light source module, the stereoscopic imaging device and the stereoscopic display system according to the embodiment of the present invention can improve the utilization rate of the light source. Especially in the case where a group has only a laser outputting light of one wavelength, the group always outputs light, resulting in an even higher utilization rate of the light source.

Moreover, the light output from the stereoscopic light source module according to the embodiment of the present invention allows a projection subsystem to simultaneously output s-polarized and p-polarized images. Compared with the prior art which uses two projection subsystems and two corresponding light source modules, the stereoscopic light source module according to an embodiment of the present invention creates the preconditions for reducing the size of the projection system as well as reducing its manufacturing and processing costs.

Furthermore, in the stereoscopic light source module according to the embodiment of the present invention, light of any wavelength from the light combining element is output alternately between p-polarized and s-polarized over time; and whether it is p-polarized or s-polarized, the power of it is almost equal to the total output power of the laser whose output light is of the wavelength. Compared with the prior art where the polarized light output by a laser is divided simultaneously into a p-polarized component and an s-polarized component, the stereoscopic light source module according to the embodiment of the present invention has a higher power of the s-polarized output and a higher power of the p-polarized output, thus increasing the brightness of the eventual s-polarized and p-polarized images.

In practice, the polarization conversion rotary element 13 may have various structures that meet the above requirements, examples of which are given below.

Embodiment 1

Figure 2:
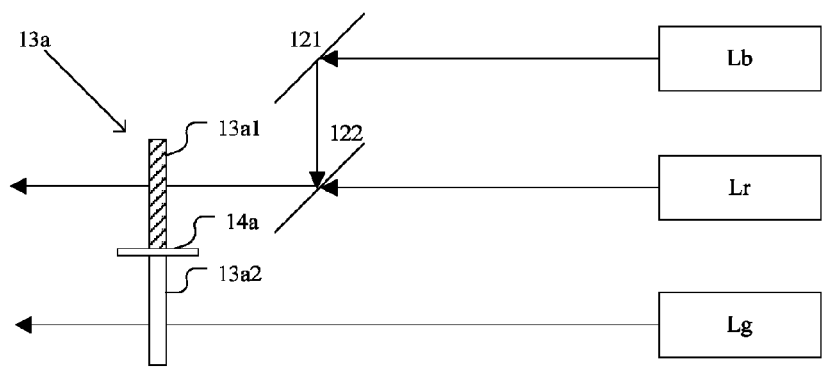
FIG. 2 is a schematic diagram illustrating a stereoscopic light source module according to an embodiment of the present invention.

FIG. 2 is a schematic diagram illustrating a stereoscopic light source module according to an embodiment of the present invention. In this embodiment, the stereoscopic light source module may include three lasers for outputting red, green and blue lights respectively. The three lasers will be referred to as Lr, Lg and Lb hereinafter, and it is assumed that the polarized lights output by the three lasers are all p-polarized.

Generally, the lasers that are divided into one group are driven sequentially to output lights in an alternating manner. When there are three lasers in the entire stereoscopic light source, the grouping of lasers may depend on the actual needs of the user. For example, tests showed that, of red, green and blue lasers, driven by the same power, the luminance of green light output by the green laser is the largest. Therefore, in order to improve the brightness of display at a low cost, it is desirable to increase the output time of the green laser. Based on such consideration, the green laser Lg may be divided into one group G2, and the rest of lasers, i.e., the red laser Lr and the blue laser Lb, may be divided into another group G1.

In the embodiment, only the group G1 includes multiple lasers, and only the output light path of the red laser Lr and the blue laser Lb in group G1 is provided with a light combining element. As shown in FIG. 2, the light combining element may include a first reflecting mirror 121 and a first dichroic mirror 122. P-polarized blue light output by the blue laser Lb strikes the surface of the first dichroic mirror 122 after being reflected by the first reflecting mirror 121, and reflects off the first dichroic mirror 122. P-polarized red light output by the red laser Lr passes through the first dichroic mirror 122, and integrates with the p-polarized blue light reflected by the first dichroic mirror 122 into to one beam.

Figure 3:
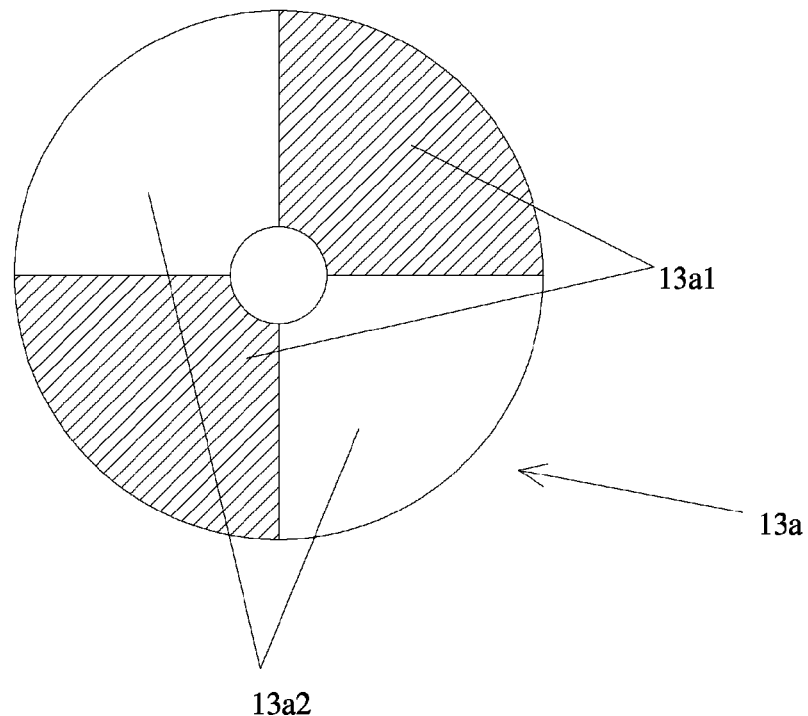
FIG. 3 is a front view of a polarization conversion rotary element shown in FIG. 2.

In the embodiment, the polarization conversion rotary element 13a may have a roulette-based structure. FIG. 3 shows a front view of the polarization conversion rotary element 13a in the embodiment. The surface of the polarization conversion rotary element 13a (i.e., the surface of the roulette) is perpendicular to the transmission direction of the two beams obtained from the light combining elements for the groups G1 and G2; and the rotation axis 14a is parallel to the transmission direction of the two beams obtained from the light combining elements for the groups G1 and G2. Hence, the rotation axis 14a is perpendicular to the plane of the polarization conversion rotary element 13a.

As shown in FIG. 3, the polarization conversion rotary element 13a can be divided into polarization conversion regions 13a1 and polarization non-changing regions 13a2 that are positioned alternately in the direction of rotation. In FIG. 3, as an example, the polarization conversion rotary element 13a includes two polarization conversion regions 13a1 and two polarization non-changing regions 13a2 that are positioned alternately in the direction of rotation. Clearly, in practice, the number of the polarization conversion regions and the number of the polarization non-changing regions can be determined according to actual needs, i.e., the number of the divided regions on the polarization conversion rotary element 13a can be determined according to actual needs.

The polarization conversion region 13a1 may be a half-wave plate for changing the polarization direction of light passing through it by 90 degrees. The polarization non-changing region 13a2 may be a transparent region that does not make any change to the polarization direction of light passing through it, e.g., the polarization non-changing region 13a2 may be made of glass. During the rotation of the polarization conversion rotary element, one beam from one group strikes a polarization conversion region, while one beam from the other group strikes a polarization non-changing region.

Driven by a driving device, the polarization conversion rotary element 13a having a roulette-based structure rotates around the rotation axis 14a, so that the polarization conversion regions 13a1 and the polarization non-changing regions 13a2 on the polarization conversion rotary element 13a alternately cut through the light path of the beam of red and blue lights from the group G1 and the light path of the beam of green light from the group G2. Specifically, in a first operating state of the polarization conversion rotary element 13a, a polarization conversion region 13a1 on the polarization conversion rotary element 13a is in the light path of the beam from the group G1, and a polarization non-changing region 13a2 on the polarization conversion rotary element 13a is in the light path of the beam from the group G2. At this moment, p-polarized red light and p-polarized blue light from the group G1 pass through the half-wave plate of the polarization conversion region 13a1, and are changed by 90 degrees in their polarization directions, resulting in s-polarized red output and s-polarized blue output; p-polarized green light from the group G2 passes through the polarization non-changing region 13a2, and is not changed in its polarization direction, resulting in p-polarized green output. Therefore, in the first operating state, the stereoscopic light source module in the embodiment outputs s-polarized red light, s-polarized blue light and p-polarized green light; and whether it is s-polarized or p-polarized, the power is almost equal to the power of the output light of the corresponding laser. Similarly, in a second operating state of the polarization conversion rotary element 13a, p-polarized red light and p-polarized blue light from the group G1 pass through the polarization non-changing region 13a2 and are not changed in their polarization directions, resulting in p-polarized red output and p-polarized blue output; p-polarized green light from the group G2 passes through the half-wave plate of the polarization conversion region 13a1, and is changed by 90 degrees in its polarization direction, resulting in s-polarized green output. Therefore, in the second operating state, the stereoscopic light source module in the embodiment outputs p-polarized red light, p-polarized blue light and s-polarized green light; and whether it is s-polarized or p-polarized, the power is almost equal to the power of the output light of the corresponding laser.

As can be seen, in the stereoscopic light source module according to the embodiment of the present invention, the lasers in each of the groups output lights in an alternating manner, but light output from one group as a whole is continuous. Compared with the prior art where all the lasers are illuminated sequentially, the stereoscopic light source module according to the embodiment of the present invention can improve the utilization rate of the light source. Moreover, since the group G2 has only a laser outputting green light, the group always outputs light, resulting in an even higher utilization rate of the light source.

Furthermore, based on the continuous rotation of the polarization conversion rotary element 13a having a roulette-based structure, light of any wavelength from the stereoscopic light source module is output alternately between p-polarized and s-polarized. For each wavelength, whether the light is p-polarized or s-polarized, the power of it is almost equal to the total output power of the laser whose output light is of the wavelength, thus increasing the brightness of the displayed image.

Embodiment 2

Figure 4:
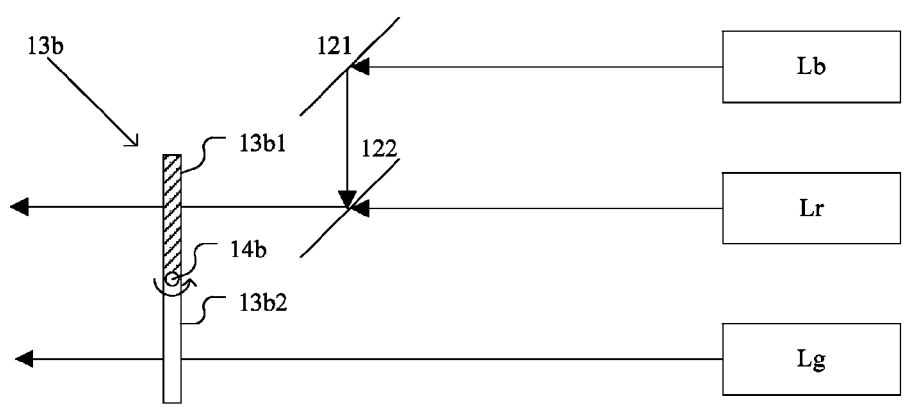
FIG. 4 is a schematic diagram illustrating a stereoscopic light source module according to an embodiment of the present invention.

FIG. 4 is a schematic diagram illustrating a stereoscopic light source module according to another embodiment of the present invention. The difference between the stereoscopic light source module in this embodiment and the stereoscopic light source module in Embodiment 1 lies in the structure of the polarization conversion rotary element.

The stereoscopic light source module in this embodiment may include three lasers for outputting red, green and blue lights respectively, denoted as Lr, Lg and Lb respectively. It is assumed that the polarized lights output by the three lasers are all p-polarized. The green laser Lg may be divided into a separate group G2, and the red laser Lr and the blue laser Lb may be divided into another group G1.

In the embodiment, p-polarized red light and p-polarized blue light output by the red laser Lr and the blue laser Lb may be combined into one beam through a first reflecting mirror 121 and a first dichroic mirror 122.

Figure 5:
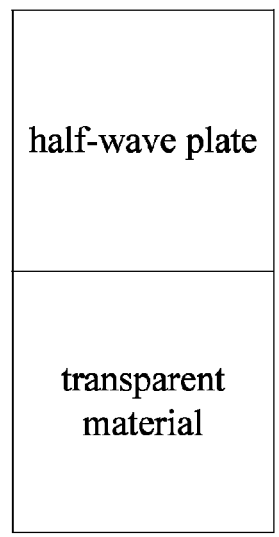
FIG. 5 is a front view of a polarization conversion rotary element shown in FIG. 4.

In the embodiment, the polarization conversion rotary element 13b may have a sheet-shaped structure. FIG. 5 shows a front view of the polarization conversion rotary element 13b according to the embodiment. The surface of the polarization conversion rotary element 13b (i.e., the surface of the sheet-shaped structure) is perpendicular to the plane formed by the transmission paths of the two beams obtained from the light combining elements for the groups G1 and G2; and the rotation axis 14a of the polarization conversion rotary element 13b is perpendicular to the plane formed by the transmission paths of the two beams obtained from the light combining elements for the groups G1 and G2.

The polarization conversion rotary element 13b can be divided into a first region 13b1 and a second region 13b2 along the direction from one of the two incident beams (i.e., the two beams from the groups G1 and G2) to the other. The first region 13b1 may be a half-wave plate for changing the polarization direction of light passing through it by 90 degrees. The second region 13b2 may be a transparent region that does not make any change to the polarization direction of light passing through it.

Driven by a driving device, the polarization conversion rotary element 13b rotates around its rotation axis 14b, i.e., in a direction perpendicular to the plane formed by the transmission paths of the two beams from the groups G1 and G2, so that the first region 13a1 and the second region 13a2 on the polarization conversion rotary element 13a alternately cut through the light path of the beam of red and blue lights from the group G1 and the light path of the beam of green light from the group G2.

Specifically, in a first operating state during the rotation of the polarization conversion rotary element 13b, the first region 13b1 on the polarization conversion rotary element 13b is in the light path of the beam from the group G1, and the second region 13b2 on the polarization conversion rotary element 13b is in the light path of the beam from the group G2. At this moment, p-polarized red light and p-polarized blue light from the group G1 pass through the half-wave plate of the first region 13b1, and are changed by 90 degrees in their polarization directions, resulting in s-polarized red output and s-polarized blue output; p-polarized green light from the group G2 passes through the second region 13b2, and is not changed in its polarization direction, resulting in p-polarized green output. Therefore, in the first operating state, the stereoscopic light source module in the embodiment outputs s-polarized red light, s-polarized blue light and p-polarized green light; and whether it is s-polarized or p-polarized, the power is almost equal to the power of the output light of the corresponding laser. Similarly, in a second operating state of the polarization conversion rotary element 13b, p-polarized red light and p-polarized blue light from the group G1 pass through the second region 13b2 and are not changed in their polarization directions, resulting in p-polarized red output and p-polarized blue output; p-polarized green light from the group G2 passes through the half-wave plate of the first region 13b1, and is changed by 90 degrees in its polarization direction, resulting in s-polarized green output. Therefore, in the second operating state, the stereoscopic light source module in the embodiment outputs p-polarized red light, p-polarized blue light and s-polarized green light; and whether it is s-polarized or p-polarized, the power is almost equal to the power of the output light of the corresponding laser.

As can be seen, in the stereoscopic light source module according to the embodiment of present invention, the lasers in each of the groups output lights in an alternating manner, but light output from one group as a whole is continuous. Compared with the prior art where all the lasers are illuminated sequentially, the stereoscopic light source module according to the embodiment of the present invention can improve the utilization rate of the light source. Moreover, since the group G2 has only a laser outputting green light, the group always outputs light, resulting in an even higher utilization rate of the light source.

Furthermore, based on the continuous rotation of the polarization conversion rotary element 13b having a sheet-shaped structure, light of any wavelength from the stereoscopic light source module is output alternately between p-polarized and s-polarized over time. For each wavelength, whether the light is p-polarized or s-polarized, the power of it is almost equal to the total output power of the laser whose output light is of the wavelength, thus increasing the brightness of the displayed image.

Embodiment 3

Figure 6:
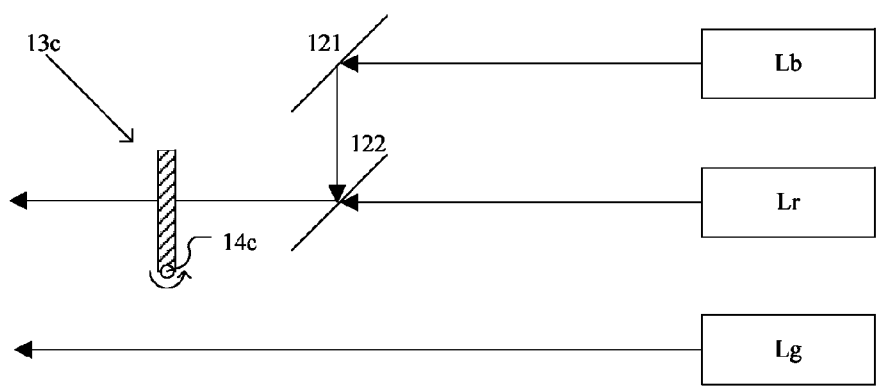
FIG. 6 is a schematic diagram illustrating a stereoscopic light source module according to an embodiment of the present invention.

FIG. 6 is a schematic diagram of a stereoscopic light source module according to another embodiment of the present invention. The difference between the stereoscopic light source module in this embodiment and those in Embodiment 1 and Embodiment 2 lies in the structure of the polarization conversion rotary element.

The stereoscopic light source module in this embodiment may include three lasers for outputting red, green and blue lights respectively, denoted as Lr, Lg and Lb respectively. It is assumed that the polarized lights output by the three lasers are all p-polarized. The green laser Lg may be divided into a separate group G2, and the red laser Lr and the blue laser Lb may be divided into another group G1. P-polarized red light and p-polarized blue light output by the red laser Lr and the blue laser Lb may be combined into one beam through a first reflecting mirror 121 and a first dichroic mirror 122.

In the embodiment, the polarization conversion rotary element 13c may also have a sheet-shaped structure. The difference between the polarization conversion rotary element 13c in the embodiment and that in Embodiment 2 is that the polarization conversion rotary element 13c is formed by a half-wave plate. The surface of the polarization conversion rotary element 13c (i.e., the surface of the sheet-shaped structure) is perpendicular to the plane formed by the transmission paths of the two beams obtained from the light combining elements for the groups G1 and G2; the rotation axis 14c of the polarization conversion rotary element 13c is perpendicular to the plane formed by the transmission paths of the two beams obtained from the light combining elements for the groups G1 and G2; and the rotation axis 14c is positioned at one end of the polarization conversion rotary element 13c. The half-wave plate of the polarization conversion rotary element 13c is used to change the polarization direction of light passing through it by 90 degrees.

Driven by a driving device, the polarization conversion rotary element 13c rotates around its rotation axis 14c, so that the polarization conversion rotary element 13c alternately cuts through the light path of the beam of red and blue lights from the group G1 and the light path of the beam of green light from the group G2.

Specifically, during the rotation of the polarization conversion rotary element 13c, when the polarization conversion rotary element 13c is in the light path of the beam of red and blue lights from the group G1, p-polarized red light and p-polarized blue light from the group G1 pass through the half-wave plate on the polarization conversion rotary element 13c, and are changed by 90 degrees in their polarization directions, resulting in s-polarized red output and s-polarized blue output; p-polarized green light from the group G2 does not pass through the polarization conversion rotary element 13c, and is not changed in its polarization direction, resulting in p-polarized green output. When the polarization conversion rotary element 13c is in the light path of the beam of green light from the group G2, p-polarized red light and p-polarized blue light from the group G1 does not pass through the polarization conversion rotary element 13c and are not changed in their polarization directions, resulting in p-polarized red output and p-polarized blue output; p-polarized green light from the group G2 passes through the half-wave plate on the polarization conversion rotary element 13c, and is changed by 90 degrees in its polarization direction, resulting in s-polarized green output. In above process, for light of any color, whether it is output s-polarized or p-polarized, the power is almost equal to the power of the output light of the corresponding laser.

As can be seen, in the stereoscopic light source module according to the embodiment of the present invention, the lasers in each of the groups output lights in an alternating manner, but light output from one group as a whole is continuous. Compared with the prior art where all the lasers are illuminated sequentially, the stereoscopic light source module according to the embodiment of the present invention can improve the utilization rate of the light source. Moreover, since the group G2 has only a laser outputting green light, the group always outputs light, resulting in an even higher utilization rate of the light source.

Furthermore, based on the continuous rotation of the polarization conversion rotary element 13c having a deflecting structure, light of any wavelength from the stereoscopic light source module is output alternately between p-polarized and s-polarized over time. For each wavelength, whether the light is p-polarized or s-polarized, the power of it is almost equal to the total output power of the laser whose output light is of the wavelength, thus increasing the brightness of the displayed image.

Figure 7:
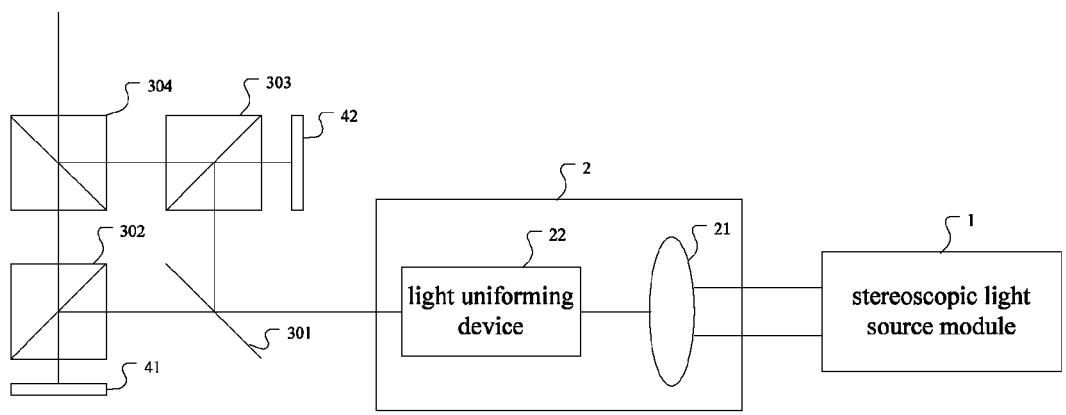
FIG. 7 is a schematic diagram illustrating a stereoscopic imaging device provided by an embodiment of the present invention.

An embodiment of the present invention provides a stereoscopic imaging device. FIG. 7 is a schematic diagram illustrating the stereoscopic imaging device. The stereoscopic imaging device includes the stereoscopic light source module 1 as described above, a beam combining element 2, a polarizing splitting and combining element 3 and a first optical imaging modulator 41 and a second optical imaging modulator 42. The stereoscopic imaging device 1 may have any of the structures described in the embodiments above.

The beam combining element 2 is used to combine two beams output by the stereoscopic light source module 1 into one beam. As discussed above, each of the two beams output by the stereoscopic light source module 1 includes lights of different wavelengths, and the polarization directions of the two beams are orthogonal to each other. The polarization direction of each of the beams changes over time, e.g., between p-polarized and s-polarized. Therefore, at any moment, light output by the beam combining element 2 includes both p-polarized and s-polarized lights. For light of a certain wavelength in the output light, its polarization direction varies between p-polarized and s-polarized over time.

The polarizing splitting and combining element 3 receives the one beam output by the beam combining element 2, divides it into a p-polarized component and an s-polarized component, and inputs the p-polarized component and the s-polarized component to the first optical imaging modulator 41 and the second optical imaging modulator 42 respectively. The first optical imaging modulator 41 is used to modulate the p-polarized incident light according to an image signal; and the second optical imaging modulator 42 is used to modulate the s-polarized incident light according to an image signal. The polarizing splitting and combining element 3 is also used to combine the modulated, p-polarized and s-polarized lights from the first optical imaging modulator 41 and the second optical imaging modulator 42 into one beam. As show in FIG. 7, the polarizing splitting and combining element 3 may include 4 Polarizing Beam Splitter (PBS) prisms 301-304.

Specifically, the PBS prism 301 divides the one beam output by the beam combining element 2 into a p-polarized component and an s-polarized component. The PBS prism 302 reflects the p-polarized obtained from the PBS prism 301 to the first optical imaging modulator 41 and inputs the modulated, p-polarized light from the first optical imaging modulator 41 to the PBS prism 304. The PBS prism 303 reflects the s-polarized obtained from the PBS prism 301 to the second optical imaging modulator 42, and inputs the modulated, s-polarized light from the second optical imaging modulator 42 to the PBS prism 304. The PBS prism 304 combines the modulated, p-polarized incident light and the modulated, s-polarized incident light into one beam.

The beam combining element 2 may include a focusing lens 21 and a light uniforming device 22. The focusing lens 21 focuses the two beams output by the stereoscopic light source module 1 to the light uniforming device 22. The light uniforming device 22 uniforms the two beams focused by the stereoscopic light source module, and outputs one uniform beam.

The first optical imaging modulator and the second optical imaging modulator may be liquid crystal devices or Digital Micromirror Device (DMD) chips.

An operating process of the stereoscopic imaging device will be described in detail hereinafter. It is assumed that the period of rotation of a polarization conversion rotary element in the stereoscopic light source module 1 is T, which also corresponds to the time for projecting a frame.

When the polarization conversion rotary element is in a first time period t1 within the rotation period T, the polarization conversion rotary element converts p-polarized lights of all wavelengths output from a first group of lasers into s-polarized, without changing the polarization directions of p-polarized lights of all wavelengths output from a second group of lasers. The lasers of all wavelengths in the first group are driven sequentially in a time-division multiplexing manner to output polarized lights of corresponding wavelengths, therefore, the lights of all wavelengths output from the first group are input to the second optical imaging modulator 42 in a time-division multiplexing manner. Color channels of the image signal input to the second optical imaging modulator 42 correspond to the wavelengths of the lights output from the first group and input to the second optical imaging modulator 42. Therefore, the s-polarized lights that correspond to all the wavelengths output from the first group and are input to the second optical imaging modulator 42 in a time-division multiplexing manner are modulated synchronously using the corresponding color channels of the image signal, thereby obtaining part of the s-polarized frame that consists of the color channels which correspond to all the wavelengths output from the first group. Similarly, the lights of all wavelengths output from the second group are input to the first optical imaging modulator 41 in a time-division multiplexing manner. Color channels of the image signal input to the first optical imaging modulator 41 correspond to the wavelengths of the lights output from the second group and input to the first optical imaging modulator 41. Therefore, the p-polarized lights that correspond to all the wavelengths output from the second group and are input to the first optical imaging modulator 41 in a time-division multiplexing manner are modulated synchronously using the corresponding color channels of the image signal, thereby obtaining part of the p-polarized frame that consists of the color channels which correspond to all the wavelengths output from the second group.

When the polarization conversion rotary element is in a second time period t2 within the rotation period T, the polarization conversion rotary element converts p-polarized lights of all wavelengths output from the second group into s-polarized, without changing the polarization directions of p-polarized lights of all wavelengths output from the first group. The lasers of all wavelengths in the first group are driven sequentially in a time-division multiplexing manner to output p-polarized lights of corresponding wavelengths, therefore, the lights of all wavelengths output from the first group are input to the first optical imaging modulator 41 in a time-division multiplexing manner. Color channels of the image signal input to the first optical imaging modulator 41 correspond to the wavelengths of the lights output from the first group and input to the first optical imaging modulator 41. Therefore, the p-polarized lights that correspond to all the wavelengths output from the first group and are input to the first optical imaging modulator 41 in a time-division multiplexing manner are modulated synchronously using the corresponding color channels of the image signal, thereby obtaining part of the p-polarized frame that consists of the color channels which correspond to all the wavelengths output from the first group. Similarly, p-polarized lights of all wavelengths output from the second group are converted into s-polarized and then input to the second optical imaging modulator 42 in a time-division multiplexing manner. Color channels of the image signal input to the second optical imaging modulator 42 correspond to the wavelengths of the lights output from the second group and input to the second optical imaging modulator 42. Therefore, the s-polarized lights that correspond to all the wavelengths output from the second group and are input to the second optical imaging modulator 42 in a time-division multiplexing manner are modulated synchronously using the corresponding color channels of the image signal, thereby obtaining part of the s-polarized frame that consists of the color channels which correspond to all the wavelengths output from the second group.

To sum up, for a rotation period T, in the first time period t1, part of an s-polarized frame that consists of the color channels corresponding to all the wavelengths output from the first group, and part of a p-polarized frame that consists of the color channels corresponding to all the wavelengths output from the second group are output; in the second time period t2, part of an s-polarized frame that consists of the color channels corresponding to all the wavelengths output from the second group, and part of a p-polarized frame that consists of the color channels corresponding to all the wavelengths output from the first group are output. The rotation period T is less than the visual persistence time, therefore, for each rotation of the polarization conversion rotary element, the brain can fuse parts of the s-polarized frame that consist of the color channels corresponding to all wavelengths in the s-polarized frame into a complete s-polarized frame; and fuse parts of the p-polarized frame that consist of the color channels corresponding to all wavelengths in the p-polarized frame into a complete p-polarized frame. Moreover, whether it is a p-polarized or s-polarized frame, at any moment, light output by a laser of any wavelength is used for the display of a p-polarized or s-polarized frame. Therefore, compared with the prior art where light output by a laser is divided simultaneously into a p-polarized component and an s-polarized component, the stereoscopic imaging device according to the embodiment of the present invention can make full use of the total output power of the laser in both p-polarized and s-polarized lights. Therefore, under the same laser driving power, the embodiment of the present invention can improve the brightness of the displayed image.

As can be seen, in the stereoscopic imaging device according to the embodiment of the present invention, the lasers in each of the groups output lights in an alternating manner, but light output from one group as a whole is continuous. Therefore, compared with the prior art where all the lasers are illuminated sequentially, the stereoscopic imaging device according to the embodiment of the present invention can improve the utilization rate of the light source.

Moreover, the stereoscopic imaging device according to the embodiment of the present invention can simultaneously output s-polarized and p-polarized images using one projection subsystem. Compared with the prior art, the embodiment of the present invention improves the utilization rate of the light source, lowers manufacturing and processing costs, and reduces the size of the stereoscopic imaging device. In addition, reducing the number of optical devices can further lower maintenance expense of the stereoscopic imaging device, e.g., by reducing the time required for light path calibration.

Furthermore, the stereoscopic imaging device provided by an embodiment of the present invention can make full use of the total output power of the lasers in both p-polarized and s-polarized lights. Therefore, under the same laser driving power, the embodiment of the present invention can improve the brightness of the displayed image.

An embodiment of the present invention provides a stereoscopic display system, including the stereoscopic imaging device as described above and a projection lens subsystem.

The projection lens subsystem is used to project the output light from the stereoscopic imaging device. Due to the use of the stereoscopic imaging device in the embodiments above, as compared with the prior art, the brightness of the displayed image formed by the stereoscopic display system is improved significantly, with an even higher utilization rate of the light source. Moreover, the stereoscopic display system according to the embodiment of the present invention can simultaneously output s-polarized and p-polarized images using one projection subsystem. Compared with the prior art, the embodiment of the present invention improves the utilization rate of the light source, lowers manufacturing and processing costs, and reduces the size of the stereoscopic display system. In addition, reducing the number of optical devices can further lower maintenance expense of the stereoscopic display system, e.g., by reducing the time required for light path calibration.

Preferred embodiments of the present invention are described above. It should be noted that, those skilled in the art can make various improvements and modifications without deviation from the principle of the present invention. The improvements and modifications shall fall within the scope of protection of the present invention.

The invention claimed is:

1. A stereoscopic light source module, comprising
    at least three primary-color lasers, wherein lights output by the lasers have the same polarization direction;
    the at least three primary-color lasers are divided into two groups according to the wavelengths of their output lights, so that lasers whose output lights are of the same wavelength belong to the same group, and lasers in each of the groups output lights of at least one wavelength;
    an output light path of each of the groups that includes more than one primary-color laser is provided with a respective light combining element, and the respective light combining element is adapted to combine the lights output from all the lasers in the respective group into one beam;
    the stereoscopic light source module further comprises a polarization conversion rotary element arranged in the paths of the lights output from the two groups, and the polarization conversion rotary element is adapted to periodically, alternately change polarization directions of the lights output from the two groups by 90 degrees to obtain a p-polarized component and an s-polarized component;
    wherein, the polarization conversion rotary element has a sheet-shaped structure;
    a surface of the sheet-shaped structure is perpendicular to a plane formed by transmission paths of the two beams obtained from the light combining elements for the two groups; and
    the rotation axis of the polarization conversion rotary element is perpendicular to the plane formed by the transmission paths of the two beams obtained from the light combining elements for the two groups;
    the polarization conversion rotary element is divided into a first region and a second region along the direction from one of the two incident beams to the other;
    the first region is a half-wave plate for changing the polarization direction of light passing through it by 90 degrees;
    the second region is a transparent region that does not make any change to the polarization direction of light passing through it;
    the rotation axis of the polarization conversion rotary element is positioned at an interface between the first region and the second region; and
    during rotation of the polarization conversion rotary element, one beam from one group strikes the first region, while one beam from the other group strikes the second region.

2. A stereoscopic light source module, comprising
    a plurality of primary-color lasers, wherein lights output by the lasers have the same polarization direction; the plurality of primary-color lasers are divided into two groups according to the wavelengths of their output lights, so that lasers whose output lights are of the same wavelength belong to the same group, and lasers in each of the groups output lights of at least one wavelength;
    an output light path of each of the groups is provided with a light combining element, and the combining element is adapted to combine the lights output from all the lasers in one group into one beam;
    the stereoscopic light source module further comprises a polarization conversion rotary element arranged in the paths of the two beams output from the light combining elements, and the polarization conversion rotary element is adapted to periodically, alternately change polarization directions of the two beams output from the light combining elements by 90 degrees to obtain a p-polarized component and an s-polarized component;
    wherein, the polarization conversion rotary element has a roulette-based structure;
    the surface of the polarization conversion rotary element is perpendicular to a transmission direction of the two beams obtained from the light combining elements for the two groups;
    a rotation axis of the polarization conversion rotary element is parallel to the transmission direction of the two beams obtained from the light combining elements for the two groups;
    the polarization conversion rotary element is divided into polarization conversion regions and polarization non-changing regions that are positioned alternately in the direction of rotation;
    each of the polarization conversion regions is a half-wave plate for changing the polarization direction of light passing through it by 90 degrees;

each of the polarization non-changing regions is a transparent region that does not make any change to the polarization direction of light passing through it; and during rotation of the polarization conversion rotary element, one beam from one group strikes a polarization conversion region, while one beam from the other group strikes a polarization non-changing region.

3. A stereoscopic light source module, comprising:

at least three primary-color lasers, wherein lights output by the lasers have the same polarization direction;

the at least three primary-color lasers are divided into two groups according to the wavelengths of their output lights, so that lasers whose output lights are of the same wavelength belong to the same group, and lasers in each of the groups output lights of at least one wavelength;

an output light path of each of the groups that includes more than one primary-color laser is provided with a respective light combining element, and the respective light combining element is adapted to combine the lights output from all the lasers in the respective group into one beam;

the stereoscopic light source module further comprises a polarization conversion rotary element arranged in the paths of the lights output from the two groups, and the polarization conversion rotary element is adapted to periodically, alternately change polarization directions of the lights output from the two groups by 90 degrees to obtain a p-polarized component and an s-polarized component;

wherein, the polarization conversion rotary element has a sheet-shaped structure, a surface of the sheet-shaped structure is perpendicular to a plane formed by transmission paths of the two beams obtained from the light combining elements for the two groups;

a rotation axis of the polarization conversion rotary element is perpendicular to the plane formed by the transmission paths of the two beams obtained from the light combining elements for the two groups, and is positioned at one end of the polarization conversion rotary element;

the polarization conversion rotary element is formed by a half-wave plate which is adapted to change the polarization direction of light passing through it by 90 degrees; and during rotation of the polarization conversion rotary element, the polarization conversion rotary element alternately cuts through the two beams from the two groups.

4. The stereoscopic light source module according to claim 1, wherein, lasers in each of the groups output lights in an alternating manner.

5. The stereoscopic light source module according to claim 4, wherein, the primary-color lasers comprise three lasers for outputting red, green and blue lights, respectively, wherein the red and blue lasers belong to one group and the green laser belongs to the other group.

6. The stereoscopic light source module according to claim 1, wherein at least one of the groups of the primary-color lasers comprises light of at least two different colors.

7. The stereoscopic light source module according to claim 6, wherein the polarization conversion rotary element periodically, alternately changes polarization directions of the lights output from the two groups by 90 degrees to obtain a p-polarized component from one of the groups and an s-polarized component from another of the groups at the same time.

* * * * *